US012778179B2

(12) United States Patent
Klein et al.

(10) Patent No.: US 12,778,179 B2
(45) Date of Patent: Nov. 3, 2026

(54) DISTRIBUTION DEVICE FOR AN EXTRUDER

(71) Applicant: Bühler AG, Uzwil (CH)

(72) Inventors: Frieder Klein, Tägerwilen (CH); Silvan Sattler, Wilen b. Wil (CH); Robert Mitchell, Zürich (CH); David Meile, Wil (CH)

(73) Assignee: BÜHLER AG, Uzwil (CH)

( * ) Notice: Subject to any disclaimer, the term of this patent is extended or adjusted under 35 U.S.C. 154(b) by 358 days.

(21) Appl. No.: 18/549,798

(22) PCT Filed: Mar. 8, 2022

(86) PCT No.: PCT/EP2022/025091
§ 371 (c)(1),
(2) Date: Sep. 8, 2023

(87) PCT Pub. No.: WO2022/194421
PCT Pub. Date: Sep. 22, 2022

(65) Prior Publication Data

US 2024/0157625 A1 May 16, 2024

(30) Foreign Application Priority Data

Mar. 15, 2021 (EP) .................................... 21162581

(51) Int. Cl.

| | |
|---|---|
| ***A23P 30/20*** | (2016.01) |
| ***B29C 48/025*** | (2019.01) |
| ***B29C 48/695*** | (2019.01) |
| ***B29C 48/87*** | (2019.01) |
| *B29C 48/00* | (2019.01) |

(52) U.S. Cl.
CPC .......... *A23P 30/20* (2016.08); *B29C 48/0255* (2019.02); *B29C 48/695* (2019.02); *B29C 48/87* (2019.02)

(58) Field of Classification Search
CPC ............................ B29C 48/00; B29C 48/0255
See application file for complete search history.

(56) References Cited

U.S. PATENT DOCUMENTS 3,819,777 A * 6/1974 Vermeerbergen ....... B29C 48/09 264/68
5,198,261 A * 3/1993 Sasaki ..................... A23P 30/20 426/643

(Continued)

FOREIGN PATENT DOCUMENTS

CN 1047196 A 11/1990
DE 202005005881 U1 * 7/2005 ........... B29C 48/269

(Continued)

OTHER PUBLICATIONS

Chinese Office Action dated Oct. 17, 2025 for application No. 202280021847.0.

*Primary Examiner* — Atul P. Khare
(74) *Attorney, Agent, or Firm* — Colson Law Group, PLLC

(57) ABSTRACT

The present invention relates to a distribution device for an extruder, comprising at least two conduits leading away from a distribution unit, each conduit having a temperature-control device. The present invention further relates to an extrusion system comprising a distribution device of the above kind and to a method for producing a proteinaceous food item by means of the extrusion system.

13 Claims, 5 Drawing Sheets

(56) References Cited

U.S. PATENT DOCUMENTS

| | | | | |
|---|---|---|---|---|
| 5,643,618 | A | 7/1997 | Huberg et al. | |
| 10,028,516 | B2 * | 7/2018 | Jørgensen | A22C 17/0006 |
| 2005/0048178 | A1 * | 3/2005 | Alexander | B29C 48/885<br>426/516 |

FOREIGN PATENT DOCUMENTS

| | | | | | |
|---|---|---|---|---|---|
| EP | 0398315 | A2 | | 11/1990 | |
| EP | 2636314 | A1 | | 9/2013 | |
| GB | 2060474 | A | * | 5/1981 | B29C 48/865 |
| GB | 2162788 | A | | 2/1986 | |
| JP | H05328958 | A | * | 12/1993 | |
| JP | 2628220 | B2 | * | 7/1997 | |
| JP | 2892413 | B2 | * | 5/1999 | |
| WO | 2012/158023 | A1 | | 11/2012 | |
| WO | 2021/032866 | A1 | | 2/2021 | |

* cited by examiner

DISTRIBUTION DEVICE FOR AN EXTRUDER

The present invention relates to the technical field of extruding foods and feeds for animals. The present invention relates in detail to a distribution device for extruders, an extruder comprising this distribution device, and a method for processing a material analogous to meat.

The production of materials by means of extrusion has become increasingly important, in particular in the production of food items. For example, reference is made to methods for the production of textured, protein-rich food items from at least one raw material having a protein content of between 35 wt. % and 90 wt. %, in particular based on plant proteins, such food items also being referred to below as proteinaceous texture or alternative meat products ("meat alternatives").

In the course of the sustainability wave, meat alternative meats based on plant proteins are becoming increasingly important. Conventional methods for the production thereof typically comprise the following steps:

- weighing/metering of the raw materials,
- mixing the raw materials,
- pre-conditioning (optional),
- extruding, in particular with the aid of a cooling nozzle,
- cutting.

In the case of the extrusion of foodstuffs and/or the extrusion of feedstuffs for animals, what is known as wet texturing frequently takes place, in which fibrous structures form. This is the case, for example, when products comprising animal or plant proteins are extruded. A fibrous structure is not always easy to achieve, since an extrudate typically expands at the exit of the extruder, which is detrimental to a dense, compact, fibrous product structure. Therefore, for such purposes, cooling nozzles are used in the prior art, which are arranged at the outlet of the extruder and which reduce the expansion of the extrudate or, if desired, also as far as possible completely suppress it.

A significant challenge for the acceptance of alternative meat products is to adapt their texture, their color and their haptic properties (bite) as far as possible to the corresponding properties of genuine meat products.

Another challenge is to produce a large amount of such material as efficiently as possible. For this purpose, larger extruders were provided, in which a larger amount of mass can be produced. These masses are typically transferred from the extruder directly into a cooling nozzle in which the mass is cooled in a suitable manner. The passage of a large amount of extruded mass through a cooling nozzle is, however, a limiting factor due to the dimensions of a conventional cooling nozzle.

In order to increase efficiency, multiple cooling nozzles can be arranged on one extruder. For this purpose, a division of the product stream extruded from the extruder into partial flows is required. These are subsequently guided into the respective cooling nozzles.

For process control that is as efficient as possible, it is necessary for all cooling nozzles to be supplied with product in the same way. This can be achieved by providing mechanical valves or throttle flaps, by means of which the flow of product through conduits leading to the cooling nozzles can be controlled. As a result, however, the conveyed product is mechanically loaded, which can lead to an undesired influence on the product properties.

It was the object of the present invention to provide a device and a method for gently and efficiently processing large quantities of material to be extruded, in which the product properties can preferably be influenced advantageously.

The above object is achieved according to the invention by the subject matter of the appended claims.

In detail, the present invention relates to a distribution device for an extruder, comprising

- a first connecting piece for connecting the distribution device to an outlet of an extruder,
- a distribution unit,
- at least two conduits leading away from the distribution unit, each conduit having a second connecting piece, for connection to a cooling nozzle, at its end remote from the distribution unit;

wherein each conduit comprises a temperature-control device.

The distribution device according to the invention enables an efficient and precise regulation of the partial flows of a product stream extruded from an extruder.

The product stream exiting from the Extruder is divided into partial flows in a distribution unit, which are transferred through separate conduits into cooling nozzles. With the aid of a measuring device (preferably a flow meter) or mutually spaced measuring devices, for example pressure sensors arranged in an initial portion and an end portion of each conduit, deviations of the flow rates of the partial flows from one another can be determined. For example, any pressure drop in a conduit can be determined with the aid of pressure sensors. The ratio of the partial flows flowing through the corresponding conduits can be determined from the ratio or the difference between the pressure drops thus determined. Similarly, in another embodiment, the flow rates of the partial flows in the conduits can be determined with the aid of flow meters. The ratio of the partial flows flowing through the corresponding conduits can be determined from the ratio of the flow rates thus determined.

In order to achieve the most uniform possible supply of the cooling nozzles with product, the conduits can be temperature-controlled. By heating the conduit, the product flow in this conduit is increased, which is associated, at the same time, with a reduction of the product flow in the other conduit(s). By cooling the conduit, the product flow in this conduit is reduced, which is associated, at the same time, with an increase in the product flow in the other conduit(s). A change in the temperature of a conduit can lead to influencing of the frictional behavior between the extrudate and the conduit wall, and thus to a change in the flow rate of the product. Alternatively, the temperature of the product present in the conduit can be changed directly, and thus its flow rate influenced, by changing the temperature of a conduit.

According to the invention, an efficient and precise adjustment of the product flows to the respective cooling nozzles is thereby achieved. In addition, when the product flows are set, the product experiences no mechanical loading, since, according to the invention, no mechanical regulating means such as valves or throttle flaps are used. According to the invention, the product flows to the respective cooling nozzles are regulated exclusively thermally.

According to an embodiment that is particularly preferred according to the invention, the use of pressure sensors means that flow meters, which would be necessary for regulating valves or throttle flaps, can be omitted. In this embodiment, the distribution device according to the invention is easier to clean, since no components such as valves or throttle flaps or flow meters are present, and conduit tapers (i.e., reduction of the conduit diameter in a portion, for flow regulation) can be omitted.

The distribution device according to the invention is designed such that it can be detachably connected on the one hand to an extruder and, on the other hand, to cooling nozzles. All components of the distribution device according to the invention are manufactured from a material suitable for the intended use, for example from stainless steel, coated steel, or a heat-resistant plastics material.

According to the present invention, one-piece distribution devices are included in which the components mentioned here, such as first and second connecting pieces, distribution unit and conduits, describe portions of the one-piece distribution device. Furthermore, according to the present invention, distribution devices are included in which the components mentioned here, such as first and second connecting pieces, distribution unit and conduits, are separately manufactured components, at least in part, which are joined together to form the distribution device. It is also possible for individual components such as the first connecting piece and distribution unit to be manufactured in one piece and to be joined together with the other components mentioned here.

The distribution device according to the invention can be connected to any conventional extruder or to any conventional pump. For this purpose, a first connecting piece of the distribution device according to the invention is connected to an outlet of an extruder or a pump. The first connecting piece has a suitable shape in order to realize a connection to an extruder or a pump.

Conventional extruders have an end plate to which the first connecting piece of the distribution device according to the invention can preferably be connected. For this purpose, the first connecting piece is of a suitable shape and dimensions. This may be a separate component, such as a transition piece, by means of which the distribution device can be attached to an extruder or a pump in a suitable manner. However, it can also be a portion of the distribution unit (i.e., an integral component of the distribution unit, such as an end face of the distribution unit). The connection can take place with the aid of suitable and known connecting elements such as flanges, clamps, screw connections or the like.

Extruders and pumps are well known and do not have to be described in more detail here. According to the invention, commercially available extruders can be used, which are used in the prior art for producing corresponding food products. By way of example, reference is made to the extruder mentioned in WO 2012/158023 A1 or to the extruders, in particular twin-screw extruders, from the company Bühler. Such extruders preferably have an L/D ratio (length to diameter) in the range from 20 to 60, preferably 25 to 50, and particularly preferably 25 to 40. Preferably, according to the invention, the extruders are operated at 300 to 1000 rpm, particularly preferably 450 to 900 rpm.

According to the invention, they are preferably extruders which allow for a high product throughput. Such extruders are correspondingly larger than extruders which have hitherto been used for the production of proteinaceous food items such as "meat alternatives."

According to one embodiment of the present invention, the extruder can comprise a feed opening for gas, through which gas (such as $CO_2$ or $N_2$) can be introduced into the product to be treated in the extruder. In this way, a controlled pore formation in the extrudate can be achieved. An extruder of this kind is described in WO 2021/032866 A1.

Extruded product (extrudate) exits through the outlet of the extruder and enters the distribution device according to the invention. The extrudate initially enters a distribution unit. According to one embodiment of the present invention, the distribution unit can be designed essentially as a cone. The design as a circular cone is advantageous. The design as a truncated cone, in particular as a circular truncated cone, is also of course possible. In the case of a conical or circular-conical design, a shape having a spherical segment-shaped tip can be realized, as a result of which the flow behavior can be influenced in a targeted manner and adapted to the extrudate. The backflow pressure into the extruder, and the extent of shearing of the product, can be influenced.

According to an embodiment according to the invention, a screen by means of which the distribution channel can be or is narrowed can be arranged in the region of the end of the distribution unit facing away from the extruder and/or facing the extruder. In turn, product properties, in particular the fibrousness, can be influenced in a targeted manner by means of such screens.

Two or more outlets lead from the distribution element into conduits through which the product is distributed to the cooling nozzles.

Preferably, according to the invention, two conduits are provided. According to this embodiment, the distribution element has two outlets which open into the corresponding conduits.

According to one embodiment, these outlets can be designed in a tubular manner and can be arranged, for example, in a y-shaped, u-shaped or v-shaped manner, or the like (in the case of two outputs and two conduits).

The subsequent conduits are preferably cylindrical. Particularly preferably, the conduits have a constant cross-sectional area over at least 50%, preferably at least 70%, particularly preferably at least 90%, of the length (from the outlet of the distribution element to the entry into the cooling nozzle). A uniform flow rate can thus advantageously be achieved.

The conduits have an interior space through which product can be guided. The conduits are temperature-controllable, i.e., the wall of the conduit and, if applicable, the interior space and product contained therein can be cooled or heated. Temperature-control devices suitable for this purpose, such as heat exchangers or electrical heating devices, are well known. According to a preferred embodiment of the present invention, the temperature-control device surrounds the interior space of the conduit, serving as a product conduit, in a sheath-like manner, preferably over the entire length of the conduit. For example, a ring-shaped channel for cooling or heating medium can be arranged in the wall of a cylindrical conduit, through which channel corresponding cooling or heating medium, such as water or a heated gas, can be guided as required.

According to the invention, mutually spaced measuring devices are preferably provided, in order to measure the product flow in the conduits. These measuring devices are preferably selected from the group consisting of flow meters, pressure sensors, temperature measuring devices, viscosity measuring devices, or color measuring devices. These measuring devices are particularly preferably selected from the group consisting of flow meters and pressure sensors. Such devices are known and need not be explained in more detail here.

The measuring devices must be spaced apart from one another such that a reliable measurement of the product property to be determined is possible. Suitable measuring arrangements are known to a person skilled in the art.

According to a preferred embodiment, a pressure sensor or a flow meter is arranged in each case in an initial portion and an end portion of each conduit. In other words, two pressure sensors or flow meters are arranged on each conduit. The initial portion and end portion are to be understood here to mean in each case the first and last third, preferably quarter, of the overall length of the conduit.

According to a further embodiment of the present invention, in the case of the use of flow meters, only one flow meter is to be provided per conduit (for example in the initial portion or end portion of a conduit). According to a further embodiment of the present invention comprising a distribution device having two conduits, it is even sufficient to provide only one single flow meter in one of the conduits. In this case, the product stream of the other conduit can be calculated from the overall throughput which can be taken from the extruder or the pump.

According to a further embodiment of the present invention, the measuring devices can also be arranged, however, on an end plate of an extruder and at the start of a cooling nozzle.

The measuring devices, preferably the pressure sensors or flow meters, are particularly preferably arranged at the start (i.e., at the transition from the distribution element to the conduit) and/or at the end (i.e., at the transition from the conduit to the cooling nozzle) of each conduit.

Pressure sensors are well known. According to the invention, conventional pressure sensors can be used. Flow meters are also well known. According to the invention, conventional flow meters can be used.

Each conduit is connected via a second connecting piece to a corresponding cooling nozzle. The second connecting piece is of a suitable shape and dimensions in order to realize a connection to a cooling nozzle. The connection can take place with the aid of suitable and known connecting elements such as flanges, clamps, screw connections or the like. This may be a separate component, such as a transition piece, by means of which the distribution device can be fastened to a cooling nozzle in a suitable manner. However, it may also be a portion of the conduit (i.e., an integral component of the conduit, such as an end face of the conduit).

According to a preferred embodiment, the second connecting piece comprises a curved pipe portion. It can thus be achieved that obliquely arranged conduits can be connected in a suitable manner to cooling nozzles arranged horizontally with respect to the extruder or to the pump. For example, the curved tube portion can have a curvature in the range of 30° to 90°, preferably of 45°.

Cooling nozzles are well known. The distribution device according to the invention can be connected to cooling nozzles conventionally used together with extruders.

By way of example, cooling nozzles are cited as described in EP-3 524 059 A1. This is a food or feed extruder cooling nozzle, comprising an inlet end which can be attached to a food or feed extruder and on which extrudate can be guided into the cooling nozzle;

- an outlet end at which cooled extrudate is discharged;
- an extrudate flow channel extending substantially from the inlet end to the outlet end;
- at least one coolant flow channel with which the extrudate flow channel is in heat-transfer connection;
- the extrudate flow channel being formed substantially as a ring cutout in a cross section with respect to the main flow direction (8); and
- an outer wall of the extrudate flow channel is formed at least from a first segment and a second segment, the first segment and the second segment being connected to one another via mechanical connecting elements.

By means of such a cooling nozzle, capacities in the range from 20 to 3000 kg/h (preferably 500 to 3000 kg/h, more preferably 2000 to 3000 kg/h) extrudate can be achieved, with only a small structural size of the cooling tool having a typical length of 0.5 to 2.5 m (preferably 0.75 to 2.25 m, more preferably 1 to 2 m), and a diameter of 100 to 800 mm (preferably 200 to 600 mm, more preferably 400 to 600 mm). However, cooling nozzles such as slot cooling nozzles can also be used. The above description of a diameter is not applicable for such cooling nozzles.

The cooling nozzle is formed, in the regions that come into contact with the food or feed, i.e., in particular the extrudate flow channel, of stainless steel (for example, type numbers 1.43xx or 1.44xx according to EN 10088). These materials are characterized by a high level of food safety.

The measuring devices, preferably pressure sensors or flow meters, are connected to a control unit. These can be computer devices which receive signals from the pressure sensors, possibly store them, evaluate them, and output control signals, on the basis thereof, to the temperature-control devices arranged in the distribution device. Such control units are well known.

The temperature-control devices can be set independently of measuring devices and the above control unit, for example manually, depending on observed product properties. Preferably, the temperature-control devices are likewise connected to the control unit and can be controlled by them in such a way that a cooling or heating process is carried out. For example, the cooling or heating process can take place in that a locking element is released in the temperature-control device, after a corresponding signal has been received by the control unit, and a cooling or heating medium (such as water or gas of a corresponding temperature) can flow out of a reservoir into an annular portion in the sheath of the cylindrical conduit. Thus, according to the invention, a control loop having a control variable derived from the result determined by the measuring devices, and a guide variable derived from the step of heating or cooling the conduit, is preferably defined.

According to a particularly preferred embodiment of the present invention, a heat exchanger can be provided, through which extrudate flows after leaving the extruder and before entry into a cooling nozzle. It has been found that the product quality of a protein melt, in particular a wet extrudate, can be improved considerably and can be carried out more energy-efficiently if the protein melt is conducted through a heat exchanger in which a brief heat treatment (thermal shock treatment) can be carried out.

Thermal shock treatment is understood according to the invention to mean a process in which a material is exposed to a high temperature of 150-200° C. for a short time (1-10 s).

The heat exchanger may be arranged at any point between outlet from the extruder and entry in a cooling nozzle. In the case of use together with the distribution device according to the invention, the heat exchanger is preferably arranged upstream of the distribution unit of the distribution device, in order that the entire extrudate undergoes the desired thermal shock treatment before it is divided into partial flows. Alternatively, a heat exchanger can be arranged in each of the partial flows (i.e., before or after the conduits).

Heat exchangers suitable for thermal shock treatment are known. For example, reference is made to tube-sheath heat exchangers, such as a bundle tube heat exchanger. This is, for example, a device in which the product is guided through narrow channels and in the process is subjected to a homogeneous heat treatment. According to a preferred embodiment, a heat exchanger is used which has channels through which the product can be guided from a first side of the heat exchanger through an elongate, preferably cylindrical, portion, to a second side of the heat exchanger.

It has further been shown that the length of the extruder required for the method according to the invention can be reduced if a heat exchanger described above is used. For example, a part of the extruder housing (extruder housing segment, referred to in technical terms as a barrel, a barrel usually having a length of four times the diameter of the extruder screw used) can be omitted, and the extruder screw shortened accordingly, which leads to an advantageous saving of space, which has considerable relevance in particular in large extruders (as are preferably used according to the invention). It is possible, for example, to carry out the method using an extruder having 5 barrels instead of conventionally with 9 barrels. The reason for this is that a more efficient and more homogeneous heat treatment can be carried out in the heat exchanger than is possible in the extruder itself. While in an extruder primarily the outer edges of the product melt are heated, homogeneous continuous heating of the entire product melt is achieved in the above heat exchanger. This leads in particular to a desired texturing of a wet extrudate.

The present invention therefore further relates to an extrusion system comprising an extruder and a distribution device according to the invention, which is connected via a first connecting piece to an outlet of the extruder.

According to the invention, in each case a cooling nozzle is connected to each conduit of the distribution device via a second connecting piece which is arranged on an end of the conduit facing away from the distribution unit of the distribution device.

According to the invention, the extrusion system preferably comprises a distribution device according to the invention having two conduits, and correspondingly two cooling nozzles.

According to the invention, the extrusion system further comprises a heat exchanger which has channels through which the product can be guided from a first side of the heat exchanger through an elongate portion to a second side of the heat exchanger. According to this embodiment, the extruder can preferably be shortened, for example on a 5-barrel extruder (i.e., an extruder of a length corresponding to 20 times the diameter of the extruder screw used).

The above statements regarding usable extruders and cooling nozzles apply analogously here.

The present invention further relates to a method for producing a proteinaceous food item in an extrusion system described above, comprising the steps of:

a) processing a raw material mixture, at least one raw material being a protein, preferably a plant protein, in an extruder,
b) guiding the extrudate out of the extruder into the distribution device,
c) guiding partial flows of the extrudate through conduits of the distribution device into cooling nozzles, the flow rates of the partial flows in the conduits being determined by means of a measuring device, preferably a flow meter, or mutually spaced measuring devices, and deviations of the flow rates of the partial flows from one another being determined herefrom;
d) optionally heating or cooling a conduit during step c), depending on the flow rates of the partial flows determined in step c), in order to modify the flow rates of the partial flows in the conduits.

The processing of the raw material mixture in the extruder can take place in a known manner.

According to the invention, raw materials are metered into an extruder, at least one raw material being a protein, preferably a plant protein. The term "at least one raw material being a protein" also comprises embodiments in which the raw material contains a protein or represents a protein source.

Preferably plants are used as protein sources, for example pulses (such as pea, lupines or beans, for example fava beans), cereals (such as wheat, soya, oilseed rape or sunflowers), or algae. However, animal proteins such as milk protein or whey protein or proteins from muscle meat or connective tissue can also be used. However, it is preferred according to the invention to produce products which are free of animal proteins.

According to the invention, the raw materials preferably comprise at least one component which has a fiber content. By way of example, pea fibers are cited, which have a fiber content of at least 50% of their dry weight.

The proteinaceous raw materials are metered into the extruder together with a liquid. As stated above, this is at least one proteinaceous raw material described above, and a liquid described above. Optionally, a gas-forming compound and a gas-releasing compound can be added, provided that a gas is intended to be provided in the extruder by releasing the gas via a chemical reaction of these compounds.

Water, stock and/or an oil-containing substance such as an oil-containing aroma carrier can be used as liquids.

For example, the proteinaceous raw materials and the liquid are metered in such a ratio that the protein content in the raw material is greater than 50% and particularly preferably ranges from 60% to 90%. Accordingly, the starch content (carbohydrate content) in the raw material is preferably at most 50%, preferably in the range from 5 to 30%.

In addition, additives usually used for the production of alternative meat products can be added. For example, salts such as sodium chloride, fats, oils or other lipids can be added, preferably in an amount of 0.1 to 10 wt. %, based on the total weight of all the raw materials.

A wet extrudate is understood to mean an extrudate in which the solids content of the extrudate in step c) is in the range from 20% to 60%, preferably in the range from 30% to 50%. For wet extrudates, it has proven advantageous if the protein content in the dry raw materials is greater than 50%, and particularly preferably in the range from 60% to 90%.

In a first portion of the extruder, the previously weighed raw materials are metered in. Alternatively, the different raw materials can also be added to the extruder sequentially in different portions.

Before step a) of metering into the extruder, one or more of the raw materials can be preconditioned. In this way, the dwell time of the protein matrix in the process can be influenced. In this case, it is currently assumed that a longer dwell time leads to an improved fiber structure, since an increased number of cross-linked filaments is then produced during extrusion. According to the invention, the dwell time in the preconditioner is preferably 3 to 600 s, more preferably 3 to 60 s, especially preferably 5 to 15 s.

In the extruder, the raw materials metered in are mixed with one another so that a liquid, preferably aqueous, protein composition is formed. The mixer can be designed as a high-speed mixer. This can have a water and steam feed conduit. The extruder can have a water feed conduit and optionally a steam feed conduit.

In the extruder, the liquid, preferably aqueous, protein composition is processed. In this case, the composition is heated above the denaturing temperature of the protein, preferably to a temperature in the range from 80 to 180° C., more preferably 120 to 160° C., particularly preferably 130 to 150° C., depending on the protein used. The housings of the extruder are preferably temperature-controlled. The composition is kneaded under pressure (typically 1 to 60 bar, preferably 10 to 30 bar, particularly preferably 20 to 30 bar) to form a homogeneous mixture. This usually involves an energy input of 10 to 120 Wh/kg, preferably 15 to 30 Wh/kg.

The method according to the invention can in principle be operated with a throughput in the range from 40 to 10,000 kg/h, preferably 1000 to 7000 kg/h, particularly preferably 1000 to 4000 kg/h, the material in the extruder preferably having a holding time (dwell time) of 15 s to 120 s, preferably of 20 s to 90 s.

A gas introduced according to a preferred embodiment of the method according to the invention can be introduced at different positions on the extruder—either already close to the entry region, in the middle region, or in the outlet region. According to the invention, the feed opening for the gas is preferably located in a portion of the extruder which is located in the vicinity of the cooling nozzle (i.e., at the extruder outlet), preferably in the last third of the extruder length upstream of the cooling nozzle, particularly preferably in the last quarter of the extruder length upstream of the cooling nozzle.

According to a preferred embodiment of the present invention, instead of a conventional conveyor element, a kneading and/or mixing element for intensive mixing of the introduced gas with the extrudate, so that the gas is dispersed in the extrudate, is located at the position of the feed opening for the gas, in the extruder. Such elements are known. By way of example, mention may be made of what are known as hedgehog screws, barrier screws, T elements (for example from the company Extricom). These give a low energy input into the product, with simultaneously high distributing and dispersive mixing effect.

Subsequently, a step of conducting the extrudate out of the extruder into the distribution device according to the invention takes place. As stated above, the extrudate initially reaches a distribution element and is divided there into partial flows. These partial flows are guided through conduits of the distribution device into cooling nozzles, the flow rates of the partial flows in the conduits being determined by means of a measuring device (preferably a flow meter) or mutually spaced measuring devices, and a deviation of the flow rates of the partial flows from one another being determined therefrom.

Preferably, the pressure at the beginning of the conduit and at the end of the conduit is measured in each conduit. From this, a pressure difference ($p_{out}-p_{in}$) is determined, which corresponds to a pressure drop.

Subsequently, the ratio or the difference of the pressure drops in the conduits is determined in the above-described control unit. In the case of an embodiment comprising two conduits, this is, for example:

$$R = \frac{(p_{out} - p_{in})_1}{(p_{out} - p_{in})_2}$$

Based on the value determined in this way, it is decided whether substantially equal-sized partial flows are flowing through the conduits. If this is not the case, an adjustment of the partial flows can be carried out, by optionally heating or cooling a conduit during the passage of the product through the conduits. By heating the conduit, the product flow in this conduit is increased, which is associated, at the same time, with a reduction of the product flow in the other conduit(s). By cooling the conduit, the product flow in this conduit is reduced, which is associated, at the same time, with an increase in the product flow in the other conduit(s). The temperature control is carried out with the aid of the above-described temperature-control devices. A change in the temperature of a conduit can lead to influencing of the frictional behavior between the extrudate and the conduit wall, and thus to a change in the flow rate of the product. Alternatively, the temperature of the product present in the conduit can be changed directly, and thus its flow rate influenced, by changing the temperature of a conduit.

According to a particularly preferred embodiment, the method comprises an additional step d) of a thermal shock treatment of the extrudate, step d) being carried out after step a) (i.e., after exit of the extrudate from the extruder) and before entry of the extrudate into the cooling nozzles.

Preferably, the thermal shock treatment is carried out in a heat exchanger at 150 to 200° C. for 1 s to 10 s. Reference is made to the above statements regarding the heat exchanger.

According to this preferred embodiment having a heat exchanger, a modular and adjustable texturing of a material to be treated can be achieved, at lower costs and increased energy savings. The heat exchanger can be installed in a simple manner by being connected in a conventional manner to components arranged upstream and downstream.

It has been found that, when the temperature in the heat exchanger is increased, a stronger texture could be achieved in the product. According to the invention, however, the temperature in the cooling nozzle should preferably be reduced when the temperature in the heat exchanger is increased, in order to avoid undesired bubble formation in the product. According to the invention, the temperature in the cooling nozzle is thus preferably set depending on the temperature in the heat exchanger.

Typically, the extrudate is guided out through a cooling nozzle, in order to bring the extrudate below the boiling point of water and/or to evaporate water, i.e., under standard conditions to a temperature below 120° C. Cooling nozzles for extruders are well known. Typically, the extrudate is cooled to a temperature in the range from 50 to 90° C.

According to the invention, the temperature in the cooling nozzle is preferably adjusted depending on the temperature in the heat exchanger such that, in the case of a temperature in the heat exchanger of 180° C. to 200° C., a temperature in the cooling nozzle of 70° C. to 90° C. is set, and at a temperature in the heat exchanger of 150° C. to 180° C., a temperature in the cooling nozzle from below 90° C. to 100° C. is set.

According to a preferred embodiment, an oil can be added to the product melt in the extruder, in order to increase the breaking strength of the finished product. For this purpose, oils approved by food regulation, such as edible oils (for example sunflower oil) are suitable. For example, the oil can be added in a proportion in the range from 1% to 10%, preferably in the range from 2% to 6%, more preferably in the range from 3% to 4%, based on the total weight of all the raw materials metered into the extruder.

After exiting from the cooling nozzle, the extrudate can be cut in a known manner into suitable shapes and sizes in a further step.

By means of the device according to the invention and the method according to the invention, a product having novel and advantageous properties (in particular with regard to the texture) can be obtained.

The present invention thus also relates to a proteinaceous food item obtainable by a method described above.

The present invention is explained in more detail below with reference to non-restrictive embodiments and drawings. In the figures.

Figure 1:
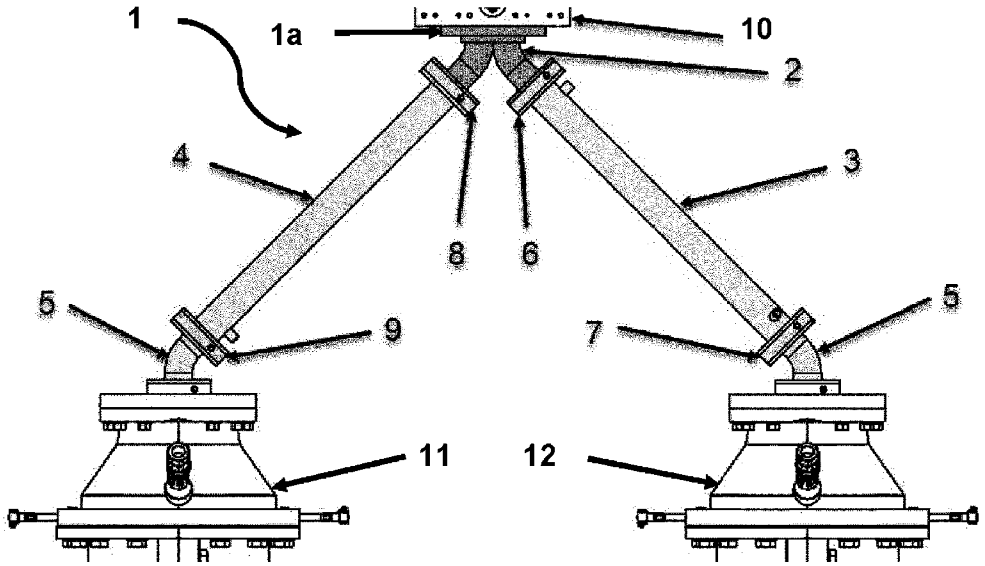
FIG. 1 shows a schematic view of a distribution device according to the invention.

FIG. 1 is a schematic view of a distribution device 1 according to the invention. The distribution device 1 is connected via a first connecting piece 1*a* to the end plate of an extruder 10. Extrudate exiting through the end plate of the extruder 10 enters a distribution unit 2, which, in the embodiment according to FIG. 1, comprises y-shaped portions in order to achieve a precise connection to the cylindrical conduits 3, 4. The embodiment according to FIG. 1 has two conduits 3, 4. The product enters cooling nozzles 11, 12 from the conduits 3, 4. Each conduit 3, 4 has a second connecting piece 5, for connection to one of the cooling nozzles 11, 12, at its end remote from the distribution unit 2.

A pressure sensor 6, 7, 8, 9 is arranged in each case in an initial portion and an end portion of each conduit 3, 4. The pressure sensors are connected to a control unit (not shown). With the aid of the pressure sensors 6, 7, 8, 9, a pressure drop in the conduits 3, 4 is determined. The ratio of the partial flows flowing through the corresponding conduits 3, 4 can be determined from the ratio of the determined pressure drops in the conduits 3, 4.

Figure 2:
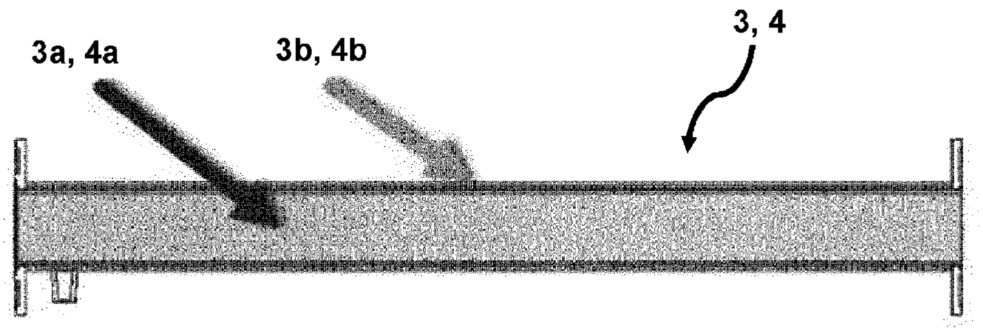
FIG. 2 shows a schematic view of a conduit of a distribution device according to the invention.

Temperature-control devices 3*b*, 4*b*, which are shown in FIG. 2, are arranged on the conduits 3, 4. With the aid of the temperature-control devices 3*b*, 4*b*, the control unit (not shown) can be used to cool or heat the interior space of the conduits 3, 4, in order to modify the product flow through the conduits 3, 4.

FIG. 2 is a schematic view of a conduit 3, 4 of a distribution device 1 according to the invention. The conduit 3, 4 is cylindrical, having an interior space 3*a*, 4*a* through which product can flow. The interior space 3*a*, 4*a* is surrounded in a sheath-like manner by a temperature-control device 3*b*, 4*b*. This can be, for example, an annular channel, through which cooling or heating medium can be conducted.

Figure 3:
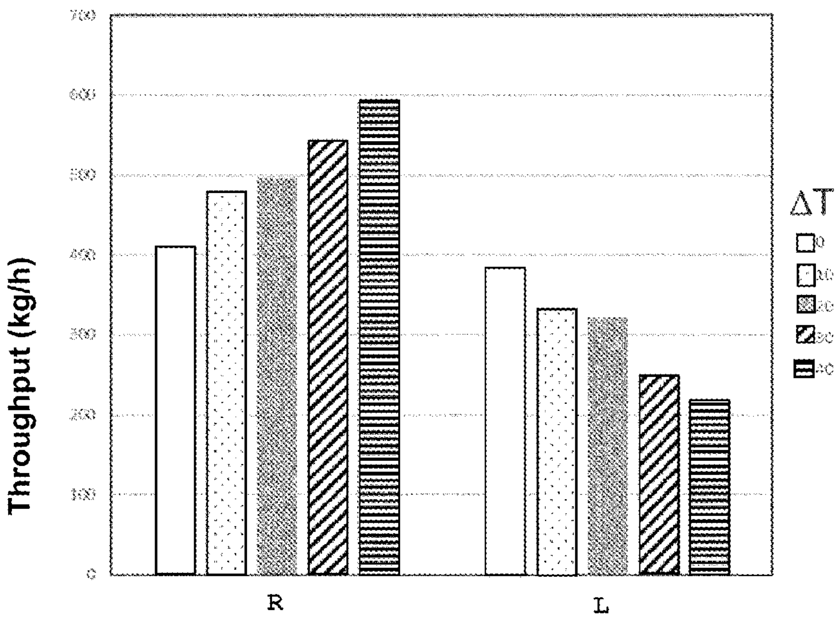
FIG. 3 shows a diagram showing the dependence of the product flow through two conduits of a distribution device according to the invention, as a function of the temperature difference in the conduits.

FIG. 3 is a graph in which the dependence of the product flow through two conduits 3, 4 of a distribution device 1 according to the invention is shown as a function of the temperature difference of the cooling or heating medium in the conduits 3, 4.

An extrudate suitable for producing a product analogous to meat (containing plant proteins) having a total throughput of 800 kg/h was conducted through the regions 3*a*, 4*a* of the conduits 3, 4, and cooling or heating medium at a temperature of about 140° C. was conducted through the regions 3*b*, 4*b* of the conduits 3, 4 of the distribution device 1 according to FIGS. 1 and 2. At the same temperature (ΔT=0) at the conduits 3, 4, approximately the same amount of product flows through each of the conduits 3, 4. If the right-hand conduit 3 was heated by 10° C. (i.e., ΔT=1 10), the product flow through the right-hand conduit 3 increased to about 480 kg/h, while the product flow through the left-hand conduit 4 dropped to about 320 kg/h. By correspondingly increasing the temperature difference ΔT at the conduits 3, 4, the difference between the product flows through the conduits 3, 4 could be further amplified. At a temperature difference ΔT=40, the difference between the product flows through the conduits 3, 4 was approximately 600 kg/h to 200 kg/h.

Figure 4:
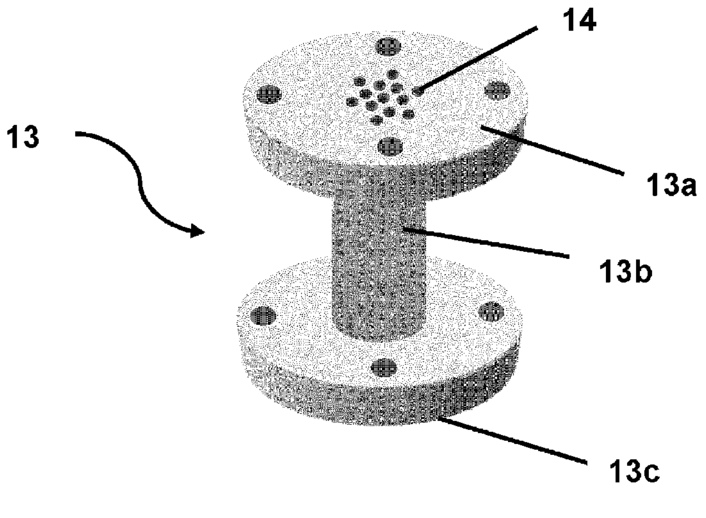
FIG. 4 shows a schematic view of an embodiment of a heat exchanger that can be used according to the invention.

FIG. 4 is a schematic view of an embodiment of a heat exchanger 13 which can be used according to the invention. This is a bundle tube heat exchanger. In the case of the heat exchanger 13, the product is guided through narrow channels 14 and is thereby subjected to a homogeneous heat treatment. Through the channels 14, the product is guided from a first side 13*a* of the heat exchanger 13, through an elongate, preferably cylindrical, portion 13*b*, to a second side 13*c* of the heat exchanger.

Figure 5:
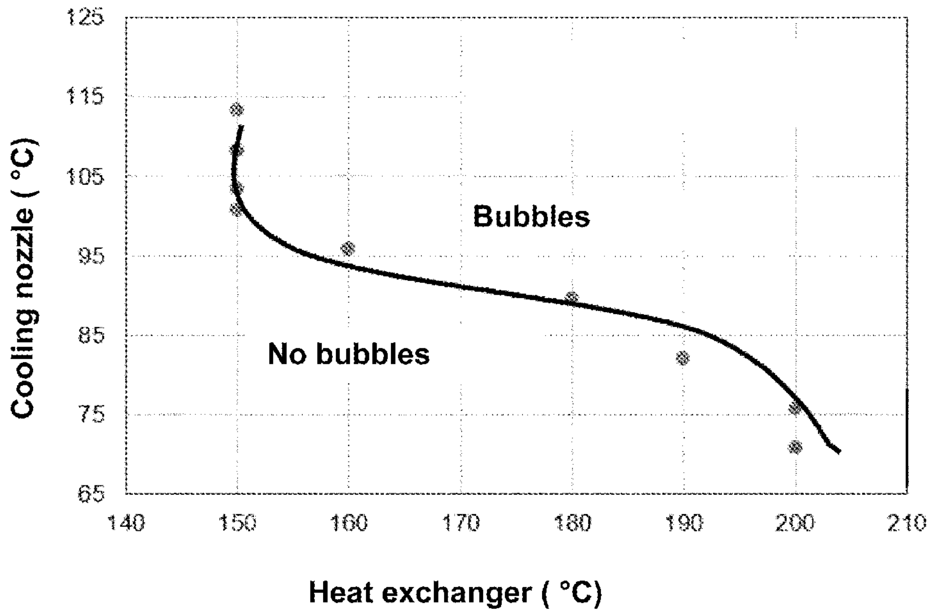
FIG. 5 shows a graph showing the dependence of the bubble formation on the temperature in the heat exchanger and the temperature in the cooling nozzle.

FIG. 5 is a graph showing the dependence of the bubble formation on the temperature in the heat exchanger 13 and the temperature in the cooling nozzle 11, 12. It can be seen that, however, when the temperature in the heat exchanger 13 is increased, the temperature in the cooling nozzle 11, 12 should be reduced, in order to avoid undesired bubble formation in the product. Preferably, the temperature in the cooling nozzle 11, 12 is adjusted depending on the temperature in the heat exchanger 13, such that, at a temperature in the heat exchanger 13 of 180° C. to 200° C., a temperature in the cooling nozzle 11, 12 of 70° C. to 90° C. is set, and at a temperature in the heat exchanger 13 of 150° C. to 180° C., a temperature in the cooling nozzle 11, 12 of below 100° C. to 90° C. is set.

The invention claimed is:

1. A distribution device for an extruder, comprising:

a first connecting piece configured to connect to an outlet of an extruder by way of a connecting element;

a distribution unit connected to the first connecting piece, and at least two conduits leading away from the distribution unit, wherein each of the at least two conduits has a second connecting piece connected thereto by way of a connecting element, the second connecting piece connected to a cooling nozzle and arranged at an end of the conduit remote from the distribution unit, wherein the second connecting piece comprises a curved pipe portion;

wherein each of the at least two conduits comprises a temperature-control device surrounding the conduit in a sheath-like manner.

2. The distribution device according to claim 1, further comprising at least one measuring device, selected from a flow meter and pressure sensor, arranged in the conduits to determine a product flow in the conduits.

3. The distribution device according to claim 1, wherein exactly two of the conduits lead away from the distribution unit.

4. The distribution device according to claim 1, wherein each of the conduits is cylindrical, and the temperature-control device surrounds the interior space of the conduits in a sheath-like manner.

5. The distribution device according to claim 1, further comprising a heat exchanger having channels configured to guide product of the extruder from a first side of the heat exchanger, through an elongate portion thereof, to a second side of the heat exchanger.

6. The distribution device according to claim 1, wherein the connecting elements are selected from flanges, clamps, and screw connections.

7. An extrusion system comprising an extruder and a distribution device according to claim 1, which is connected via the first connecting piece to the outlet of the extruder.

8. The extrusion system according to claim 7, further comprising a heat exchanger having channels configured to guide product of the extruder from a first side of the heat exchanger, through an elongate portion thereof, to a second side of the heat exchanger.

9. The extrusion system according to claim 8, wherein the extruder comprises a 5-barrel extruder.

10. A method for producing a proteinaceous food item in an extruder system according to claim 7, comprising the steps of:

a) processing a raw material mixture comprising a protein in the extruder to form an extrudate, b) leading the extrudate out of the extruder and into the distribution device, c) guiding partial flows of the extrudate through the conduits of the distribution device and into the cooling nozzles, wherein flow rates of the partial flows in the conduits are determined by means of a measuring device or mutually spaced measuring devices for determining deviations of the flow rates of the partial flows from one another, and d) optionally heating or cooling a respective one or more of the conduits during step c) by the respective temperature-control device depending on the flow rates of the partial flows determined in step c), in order to modify the flow rates of the partial flows in the conduits.

11. The method according to claim 10, wherein the method comprises an additional step d) of thermal shock treatment of the extrudate, step d) being carried out after step a) and before entry of the partial flows of the extrudate into the cooling nozzles.

12. The method according to claim 11, wherein the thermal shock treatment is carried out in a heat exchanger at 150 to 200° C. for 1 s to 10 s.

13. The method according to claim 12, wherein the temperature in the cooling nozzle is adjusted depending on the temperature in the heat exchanger.

* * * * *